(12) United States Patent
Halimi (10) Patent No.: US 10,458,872 B2
(45) Date of Patent: Oct. 29, 2019

(54) ELECTRONIC PRESSURE SENSOR FOR MEASUREMENT OF PRESSURE IN A FLUID MEDIA

(71) Applicant: Henry M. Halimi, Los Angeles, CA (US)

(72) Inventor: Henry M. Halimi, Los Angeles, CA (US)

(73) Assignee: FLO TECHNOLOGIES, INC., Los Angeles, CA (US)

( * ) Notice: Subject to any disclaimer, the term of this patent is extended or adjusted under 35 U.S.C. 154(b) by 21 days.

(21) Appl. No.: 15/453,756

(22) Filed: Mar. 8, 2017

(65) Prior Publication Data

US 2017/0261394 A1    Sep. 14, 2017

Related U.S. Application Data

(60) Provisional application No. 62/306,002, filed on Mar. 9, 2016.

(51) Int. Cl.
| | |
|---|---|
| *G01L 9/00* | (2006.01) |
| *G01K 13/02* | (2006.01) |
| *G01L 19/00* | (2006.01) |
| *G01L 19/14* | (2006.01) |

(52) U.S. Cl.
CPC .......... *G01L 19/0092* (2013.01); *G01K 13/02* (2013.01); *G01L 19/0038* (2013.01); *G01L 19/141* (2013.01)

(58) Field of Classification Search
CPC ............... G01L 19/0092; G01L 19/141; G01L 19/0038; G01L 2019/0053; G01L 19/0645; G01L 19/148; G01L 19/147; G01L 19/0627; G01L 19/0654; G01L 19/0084; H01L 2224/73265; A61B 5/0215;

(Continued)

(56) References Cited

U.S. PATENT DOCUMENTS

| 4,658,651 A * | 4/1987 | Le ..................... G01L 1/2293 29/621.1 |
| 5,600,071 A * | 2/1997 | Sooriakumar ........ G01L 9/0055 73/721 |

(Continued)

FOREIGN PATENT DOCUMENTS

WO    WO 2013179019 A1 * 12/2013 ......... B60C 23/0452

*Primary Examiner* — Brandi N Hopkins
(74) *Attorney, Agent, or Firm* — Hackler Daghighian Martino & Novak (57) ABSTRACT

An electronic pressure sensor includes a housing having a distal end configured to be exposed to a flow of a fluid media, the distal end opposite a proximal end, wherein the proximal end is configured not to be exposed to the fluid media. A chamber and connected passageway are disposed within the housing. The passageway is connected at one end to the chamber and connected at another end to an opening disposed at the distal end of the housing. The opening is configured to be in fluidic communication with the fluid media. A pressure sensor is disposed within the chamber. A first temperature sensor is disposed within the chamber. A viscous gel is disposed within the chamber, the viscous gel separating on a first side both the pressure sensor and the first temperature sensor apart from the passageway on a second side of the viscous gel.

23 Claims, 5 Drawing Sheets

(58) Field of Classification Search
CPC ..... C08L 27/06; C08L 27/18; A61M 25/0082; A61L 29/041
See application file for complete search history.

(56) References Cited

U.S. PATENT DOCUMENTS

| | | | |
|---|---|---|---|
| 6,581,484 B1* | 6/2003 | Schuler | B60S 1/0822 73/866.5 |
| 7,284,435 B2* | 10/2007 | Ueno | G01L 19/0627 73/706 |
| 2011/0132085 A1* | 6/2011 | Chiou | G01L 19/0609 73/431 |
| 2013/0248045 A1* | 9/2013 | Williams | A61B 10/0045 141/1 |
| 2014/0341255 A1* | 11/2014 | Kaiser | G01K 13/02 374/143 |

* cited by examiner

ELECTRONIC PRESSURE SENSOR FOR MEASUREMENT OF PRESSURE IN A FLUID MEDIA

CROSS-REFERENCE TO RELATED APPLICATIONS

This non-provisional application claims priority to provisional application 62/306,002 filed on Mar. 9, 2016, the entire contents of which are fully incorporated herein with these references.

FIELD OF THE INVENTION

The present invention generally relates to pressure sensors. More particularly, the present invention relates to a pressure sensor using a viscous gel that reduces manufacturing costs.

BACKGROUND OF THE INVENTION

Electronic pressure sensors are used to measure the pressure of fluid media, such as gases, liquids or combinations thereof. Some of the fluid media such as water causes damage to the electronic components of the pressure sensor. Traditionally to prevent fluid media damage to the vulnerable electrical and electronic components of an electronic pressure sensor these components are shielded by a metallic (usually stainless steel) diaphragm. This diaphragm is a thin metallic sheet that transfers the fluid media pressure to the electronic (sensor bridge) components of the sensor through a nonabrasive type of oil that is filled in the body of the sensor housing. These devices are made with stainless steel body and usually referred to as "oil filled" sensors. Manufacturing of oil filled sensors is a multi-operational and expensive process.

With emergence of automated and connected devices, demand for water pressure sensors have drastically increased but the relatively high price of traditional oil filled sensors prevents their use in many high volume applications.

There are a multitude of prior art teaching various alternatives to the oil filled option, but these are neither practical nor economical. Furthermore, the prior art doesn't teaches a solution to monitor the true fluid media temperature and pressure in the same embodiment. Additionally, the prior art doesn't safeguard against erosion of the pressure transmitting gel against water flow, i.e., they have been targeted towards stagnant fluid media and not to be installed in the path of flowing fluid media.

Accordingly, there is a need for a new type of pressure sensor that is cheaper to manufacture and doesn't erode with the use of a flowing fluid media.

SUMMARY OF THE INVENTION

An exemplary embodiment of an electronic pressure sensor includes: a housing comprising a distal end configured to be exposed to a flow of a fluid media to be measured, the distal end opposite a proximal end, wherein the proximal end is configured not to be exposed to the fluid media; a chamber disposed within the housing; a passageway disposed within the housing, the passageway connected at one end to the chamber and connected at another end to an opening disposed at the distal end of the housing, wherein the opening is configured to be in fluidic communication with the fluid media; a pressure sensor disposed within the chamber; a first temperature sensor disposed within the chamber; and a viscous gel disposed within the chamber, the viscous gel separating on a first side both the pressure sensor and the first temperature sensor apart from the passageway on a second side of the viscous gel.

In other exemplary embodiments the chamber may define at least one inner sidewall, wherein the viscous gel fully and continuously in is contact with the at least one inner sidewall. The viscous gel may fully enclose and may be in contact with the pressure sensor and the first temperature sensor. The viscous gel may be configured to prevent the fluid media from contacting the pressure sensor or first temperature sensor. The viscous gel may not be disposed within the passageway. The viscous gel may not fully fill the chamber forming an empty space of the chamber to reside connected to the passageway. In other words, an empty space is created within the chamber such that the empty space does not have the viscous gel disposed within, preventing the viscous gel from touching the end of the chamber and causing errors in the pressure sensor reading.

The housing may be an injection molded polymer housing and may be clear or translucent. Then, the viscous gel may be colored.

A second temperature sensor may be disposed within the housing and at least partially exposed at the distal end of the housing to the fluid media, wherein the second temperature sensor is not in fluidic communication with the passageway or the chamber, but the second temperature sensors is in fluidic communication with the fluid media. The pressure sensor may be an electronic bridge pressure sensor.

The pressure sensor and the first temperature sensor may be both mounted onto a circuit board, wherein the circuit board is attached to the housing.

The circuit board may seal a first end of the chamber. The second end of the chamber is in fluidic communication with the passageway. The first end and second end of the chamber are delimited by the at least one inner sidewall.

A cross section taken perpendicularly through the at least one inner sidewall defines a chamber cross sectional area, wherein the chamber cross sectional area may be larger or at least three times larger than an area of the pressure sensor exposed to the viscous gel.

A seal may be formed around the housing, the seal separating the distal end of the housing from the proximal end of the housing, wherein the seal is configured to seal to a fluid pipe containing the fluid media when the electronic pressure sensor is connected to the fluid pipe.

The passageway disposed within the housing may define a passageway length, the passageway length extending at the one end of the chamber to the opening disposed at the distal end of the housing, wherein the length is at least 5 times an average diameter or an average width of the passageway.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
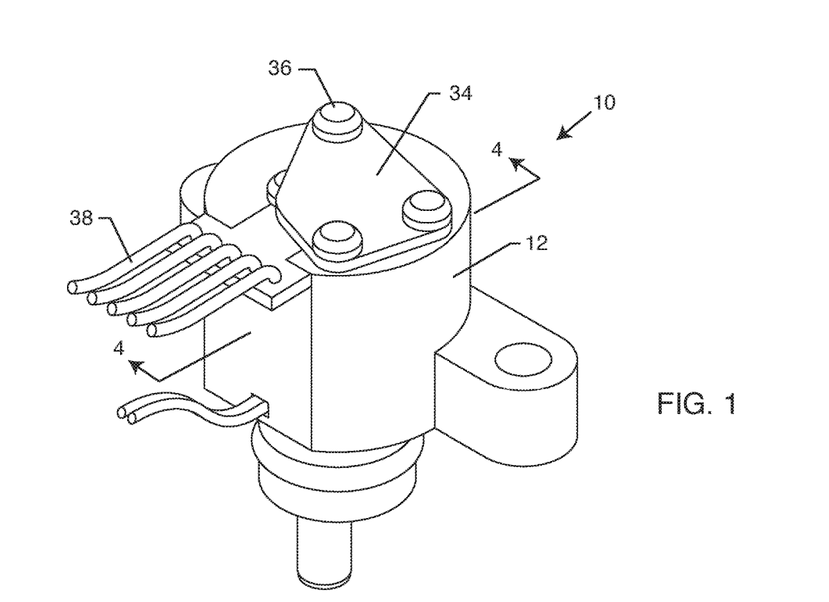
FIG. 1 is a top side perspective view of an exemplary embodiment of the present invention.
Figure 2:
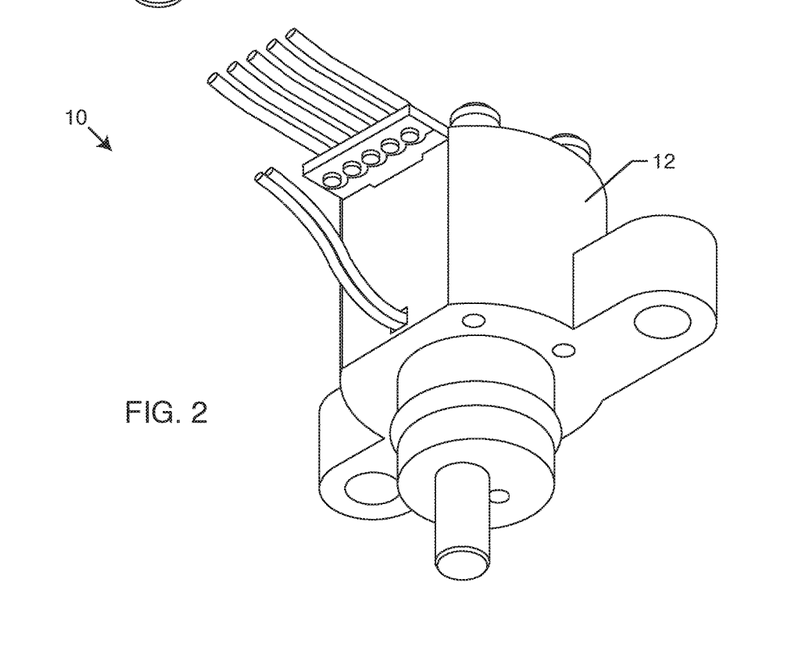
FIG. 2 is a bottom side perspective view of the structure of FIG. 1.
Figure 3:
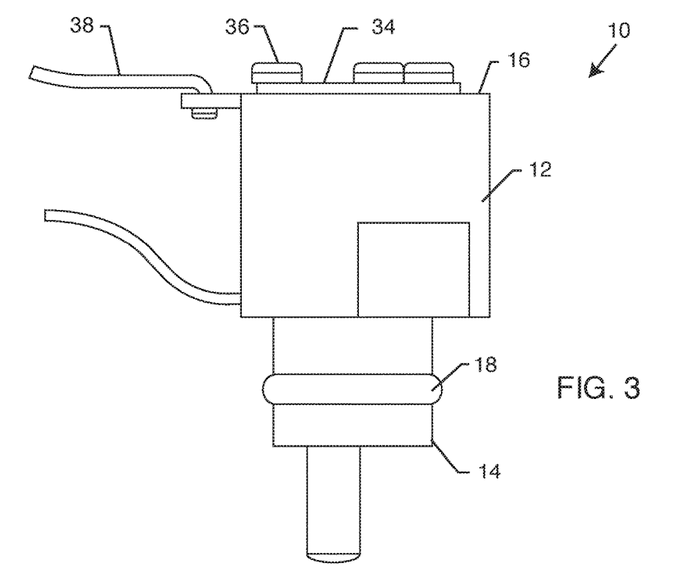
FIG. 3 is a side view of the structure of FIG. 1.
Figure 4:
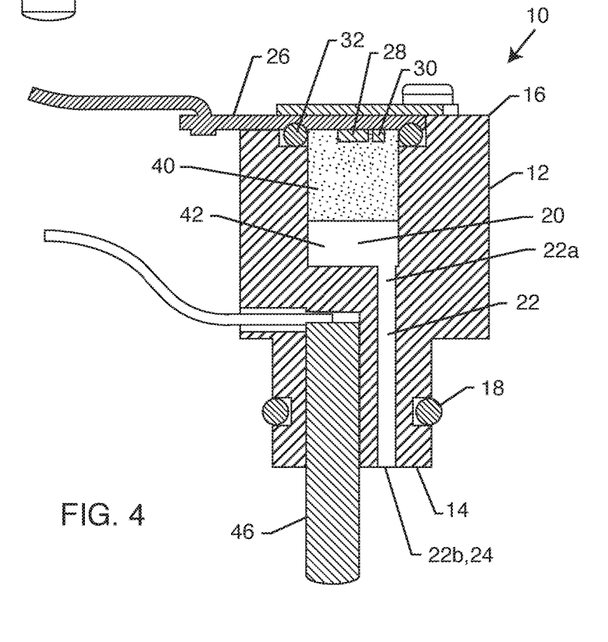
FIG. 4 is a sectional view through the structure of FIG. 1 along the same side view as FIG. 3.

FIG. 1 is a top side perspective view of an exemplary embodiment of a novel electronic pressure sensor 10. FIG. 2 is a bottom side perspective view of the structure of FIG. 1 and FIG. 3 is a side view of the structure of FIG. 1. The pressure sensor 10 can be best understood when looking at FIG. 4, which is a sectional view through the structure of FIG. 1 along the same side view as FIG. 3. FIG. 4 can also be understood as taken from lines 4-4 from FIG. 1. (As used herein, the fluid media includes liquids, gasses or combinations thereof. Also, the fluid media may be referred to simply as the fluid or as the media, as these terms are interchangeable with one another.)

A housing 12 comprises a distal end 14 that is configured to be exposed to a flow of the fluid media to be measured. Opposite the distal end 14 is a proximal end 16, wherein the proximal end is configured not to be exposed to the flow of the fluid media. A seal 18 is used to prevent the flow of the fluid media from exiting the pipe or conduit which contains the flow and separates which part of the housing is exposed to the flow and which part of the housing is outside of the flow of the fluid media. The seal 18 may be a gasket, O-ring, plumbers tape, curable adhesive or the like.

A chamber 20 is disposed (formed/made) within the housing 12. A passageway 22 is also disposed (formed/made) within the housing 12. The passageway 22 is connected at one end 22a to the chamber 20 and the passageway 22 is connected at another end 22b to an opening 24 disposed at the distal end 14 of the housing 12. The opening 24 is configured to be in fluidic communication with the flow of the fluid media.

A circuit board 26 includes a pressure sensor 28 and a first temperature sensor 30. The pressure sensor 28 and temperature sensor 30 are mounted onto the circuit board, where when the circuit board is attached to the housing 12, the pressure sensor 28 and the temperature sensor are exposed to the chamber 20. A second seal 32 may be used to seal the chamber 20. The second seal may be a gasket, O-ring, curable adhesive or the like. In this case a backing plate 34 abuts the circuit board and is held in with fasteners 36. As shown herein, electronic wiring 38 can then run from the circuit board 26 to any associated electronic processors or the like. It is understood that the circuit board 26 seals a first end 20a of the chamber 20 and a second end 20b of the chamber 20 is in fluidic communication with the passageway 22. The pressure sensor 28 may be an electronic bridge pressure sensor.

As shown in FIG. 4, a viscous gel 40 is disposed within the chamber 20. The viscous gel 40 separates on a first side (20a) both the pressure sensor 28 and first temperature sensor 30 apart from the passageway 22 on a second side (20b) of the viscous gel 40. The viscous gel 40 fully encloses and is in contact with the pressure sensor and the first temperature sensor. The viscous gel 40 is configured to prevent the fluid flow from contacting the pressure sensor or the first temperature sensor. As can be seen in FIG. 4, the viscous gel 40 is not disposed within the passageway 22. Furthermore, the viscous gel 40 does not fully fill the chamber forming an empty space 42 of the chamber 22 to reside connected to the passageway 22. The empty space fills up with the fluid media from the flow when the pressure sensor is in use.

The viscous gel can also be described as a highly viscous pressure transmitting gel that also insulates the electronic components from the fluid media. The viscosity of the proposed gel is within a range that its viscosity can be measured by the use of a penetrometer. The viscosity can be 465 cP plus or minus ten percent (10%). In other embodiments, the viscosity can range plus or minus 50 percent (50%). The symbol cP is the shorthand representation for centipoise, which is a common unit of measurement for viscosity. The poise (symbol P) is the unit of dynamic viscosity in the centimeter-gram-second system of units and received its named after Jean Léonard Marie Poiseuille. The poise is often used with the metric prefix "centi" because the viscosity of water at 20° C. is almost exactly 1 centipoise. A centipoise is one hundredth of a poise.

It is also important that the viscous gel 40 be free of air bubbles such that the pressure is properly transmitted through the viscous gel and into the pressure sensor. Therefore, when the gel is deposited or placed into the chamber 20 care should be taken to minimize or eliminate excess bubble formation.

Figure 5A:
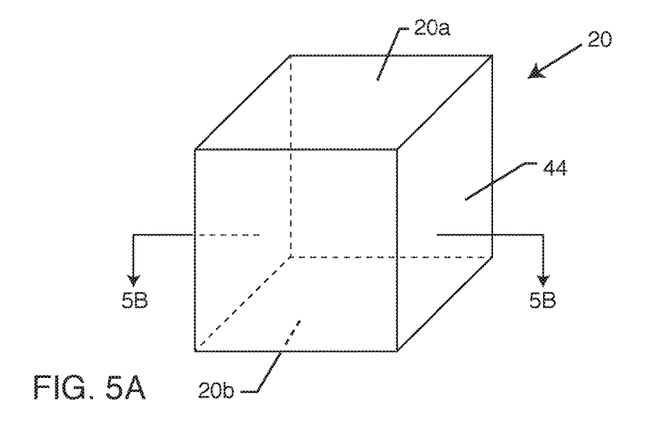
FIG. 5A is a perspective view of one embodiment of a chamber shape of the present invention.
Figure 6A:
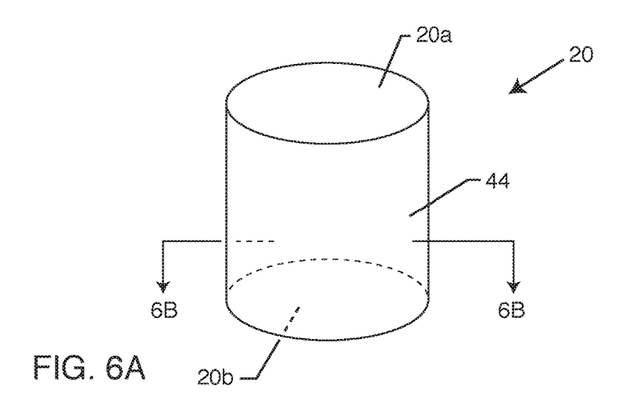
FIG. 6A is a perspective view of another embodiment of a chamber shape of the present invention.
Figure 7A:
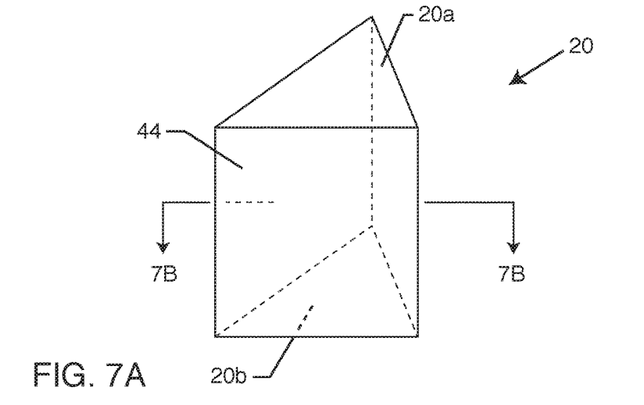
FIG. 7A is a perspective view of yet another embodiment of a chamber shape of the present invention.

The chamber 20 can take many shapes and sizes. FIGS. 5A, 6A and 7A are simplistic perspective views of the varying shapes and sizes that the chamber 20 can take. The chamber 20 can take many forms, as these figures are merely just a few of the various embodiments that one skilled in the art could use to practice the invention. The first end 20a and the second end 20b of the chamber 20 are delimited (enclosed) by at least one inner sidewall 44. As can be seen, FIG. 5A is rectangular/square in shape and has four sidewalls 44, FIG. 6A is cylindrical in shape and has one continuous sidewall 44 and FIG. 7A is triangular in shape and has three sidewalls 44. It is important to understand that the when the viscous gel 40 is in the camber 20, the viscous gel fully and continuously in is contact with the at least one inner sidewall 44. This prevents the fluid flow from bypassing the viscous gel and contacting directly the electronics on the circuit board 26 such as the pressure sensor 28 and the temperature sensor 30.

Figure 5B:
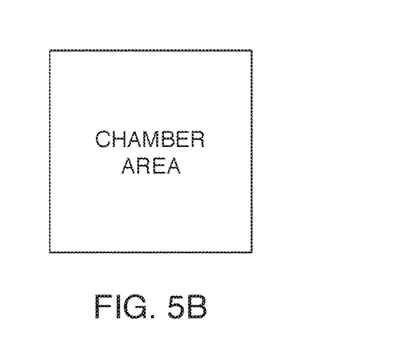
FIG. 5B is a sectional view taken from lines 5B-5B of FIG. 5A.
Figure 6B:
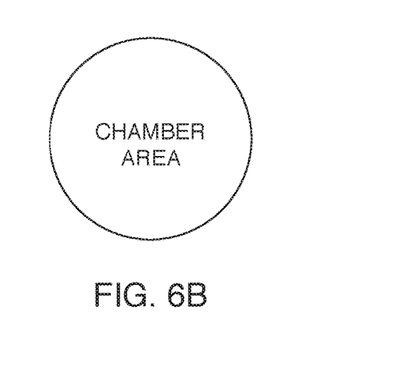
FIG. 6B is a sectional view taken from lines 6B-6B of FIG. 6A.
Figure 7B:
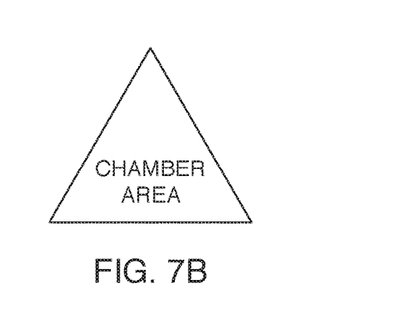
FIG. 7B is a sectional view taken from lines 7B-7B of FIG. 7A.

If one was to take a sectional view through the chambers of FIGS. 5A, 6A and 7A the result is an area which is respectively depicted in FIGS. 5B, 6B and 7B. Each shape has a corresponding chamber area. It is important that the cross-sectional area of the chamber is larger than the area of the pressure sensor. This is because the viscous gel has a certain viscosity which causes it to adhere or attach to the inner sidewall 44. If the area of the chamber was not large enough, the viscous gel resists the pressure building up in the space 42 to a great degree and prevents uniform pressure of the fluid flow from being transmitted to the pressure sensor. As the area of the chamber gets large enough, pressure can be correctly transmitted through the viscous gel and into the pressure sensor. The area of the chamber should always be at least 3 times or more (e.g. 4, 5, 6, etc.) larger than the pressure sensing area of the pressure sensor itself.

Figures 8, 9:
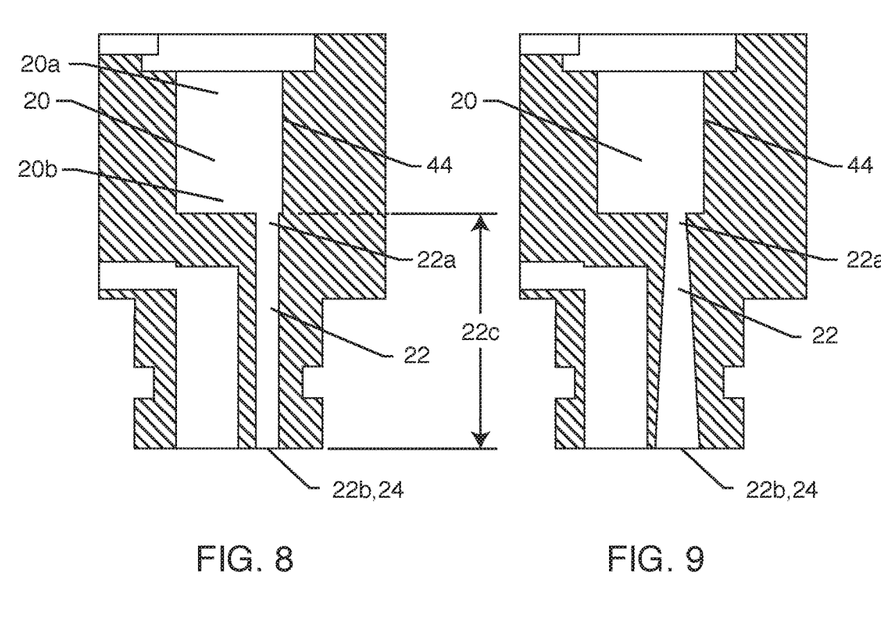
FIG. 8 is a sectional view of just the housing of the structure of FIG. 1 similar to that shown in FIG. 4.
FIG. 9 is a sectional view similar to FIG. 5 now showing another embodiment of the housing.
Figure 10:
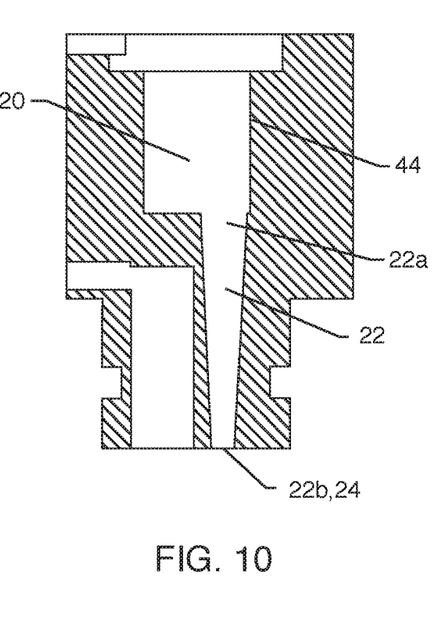
FIG. 10 is a sectional view similar to FIG. 5 now showing another embodiment of the housing.

As shown in FIGS. 8, 9 and 10, the passageway 22 can take on many shapes. The passageway is a narrow channel that leads into the chamber. The passageway is sized smaller than the chamber such that any fluid flow does not erode away the viscous gel. As can be understood, the passageway allows the pressure of the fluid flow to be transmitted into the chamber while preventing the turbulence of the fluid flow from entering the chamber. This is turn prevents the fluid flow from eroding away the viscous gel. The diameter of the passageway is minimized to prevent erosion of the gel due to the media flow and pressure variations in the media, but it also prevents direct contact to the media from the electronics of the circuit board.

FIG. 8 is the same housing as is shown in FIG. 4, where the passageway 22 has the same area along its length. FIG. 9 has a passageway 22 that gets bigger near the fluid flow end 22b of the passageway 22. FIG. 10 has a passageway 22 that gets bigger near the chamber end 22a of the passageway. As can be understood from this teaching, a variety of passageway paths and sectional shapes can be utilized. For example, such sectional shapes can include circles, squares, rectangles, triangles and other various sectional shapes similar to that of the varying chamber shapes shown in FIGS. 5, 6 and 7.

The length of the passageway 22 is important because it reduces any turbulence that may be present in the flow of the fluid media and prevents it from being transmitted to the gel 40. The length of the passageway 22 needed can vary due to a variety of factors such as viscosity of the fluid media, pressure of the fluid media, flow rate of the fluid media, diameter of the passageway itself. Therefore, generally speaking the length of the passageway should be at least 5 to 8 times the diameter of the passageway. By having such a long passageway length, this prevents erosion of the gel 40 and adds to the longevity of the pressure sensor 10. This is because the fluid media that comes into direct contact with the viscous gel is not turbulent, but rather is stagnant. In other words a stagnation zone is created in direct contact with the viscous gel.

The housing 12 can be manufactured from various metals, composites, polymers or combinations thereof. In one embodiment, the housing 12 is an injection molded polymer housing. Furthermore, the injection molded polymer housing may be clear. Then, the viscous gel 40 can include a coloring or dye, such that it is easy to visually verify whether the viscous gel 40 has properly been formed within the chamber As shown in FIG. 4, the housing 12 may include a second temperature sensor 46. The distal and sensing end of the second temperature sensor may be at least partially exposed at the distal end of the housing such that it is exposed to the fluid flow. As one can see in FIG. 4, the second temperature sensor 46 is not in fluidic communication with the passageway 22 or the chamber 20.

The printed circuit board (PCB) 26 contains the pressure sensor bridge 28 and the temperature sensor 30 in close proximity to each other. The temperature sensor reading is used to measure the temperature of the gel which is similar to the temperature of the pressure sensor at the face of the bridge. The temperature reading is used as an input to the microprocessor for temperature compensation calculations. This is desired because the pressure sensor itself can change its reading based on the temperature, so it is needed to know the temperature of the pressure sensor so accurate readings can be determined for temperature compensation calculations.

The novel design disclosed herein results in an economical, durable and environmentally friendly pressure sensor that uses the pressure transmitting gel as insulation of its electrical/electronic components. The pressure sensor may be used for measurement of fluids (fluids including liquids and/or gasses) such as being suitable for use in potable water applications.

In other words, one may want to drink from the water in which the pressure sensor 10 is being utilized. Therefore, the gel 40 of the present invention is and should be able to pass any local drinking water guidelines necessary. Stringent potable water contamination guidelines are an additional compelling reason that restricts substantial exposure of foreign elements to water which the present invention satisfies. The present invention has used gels approved for use with potable water systems. It is also understood that the type of gel may change depending on the end use of different fluid media to be sensed. Furthermore, different types and viscosities of the viscous gel change the accuracy range of the pressure to be detected.

The pressure sensor 28 and temperature sensor 30 outputs are inputted to a microprocessor. The microprocessor deploys the input signals in temperature compensation algorithms that is initially calibrated under controlled conditions. Specialized mathematical algorithms are deployed in temperature compensation calculations. The microprocessor output signal may be analog or digital. An accurate pressure of the fluid flow can then be accurately calculated. It is noted that the second temperature is an optional component and that the present invention can work with only the first temperature sensor 30.

Figure 11:
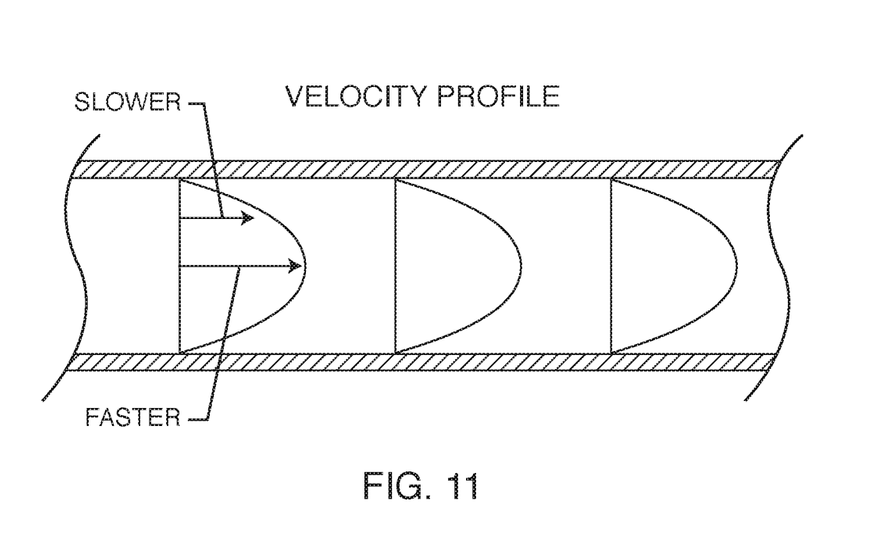
FIG. 11 is a typical velocity profile as seen through a section of a circular pipe.
Figure 12:
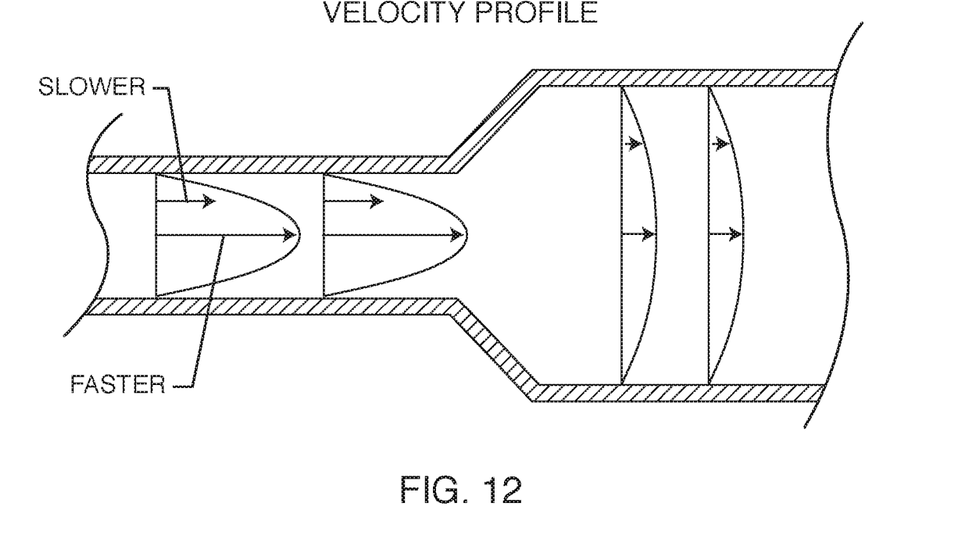
FIG. 12 is also shows two different velocity profiles for two different sized pipes with the same flow rate.

Generally, flow of liquid through a cross section of a pipe is not even, assuming laminar flow of the media. Flow is largest (fastest) at the center of the pipe and much smaller along the wall of the pipe. This is referred to as the parabolic velocity profile as shown in FIG. 11. Shape of the velocity profile is also dependent of the speed of the media through the pipe. The profile tends to get longer as the viscosity of the liquid increases. This is logical because fluid sticks more to the inner wall of the pipe. As shown in FIG. 12 by increasing the diameter of the pipe/cylinder the same media will have a shallower profile.

In the same respects, to insure even pressure across the surface of pressure sensor 28, the balance between the gel viscosity and chamber area has to be maintained. The present invention uses Dow Corning Sylgard 527 Silicone Dielectric Gel. This is a Polydinerhylsiloxane gel. Viscosity of the gel after mixing and curing is 465 cP.

Selection of the type and viscosity of the gel is dependent on several factors including: length of the chamber, diameter of the chamber, shape of the chamber, depth of gel inside the chamber, sensor surface area and target pressure range. All the above factors must be considered in design and accuracy of the sensor. For example, by increasing the viscosity of the gel, pressure sensitivity decreases, so does the shape of the velocity profile that effects the ratio of the chamber diameter to the surface area of the sensor wafer. In the target pressure range for any novel sensor taught herein, the viscosity can vary plus or minus 10 percent and the present invention will still work appropriately.

Although several embodiments have been described in detail for purposes of illustration, various modifications may be made to each without departing from the scope and spirit of the invention. Accordingly, the invention is not to be limited, except as by the appended claims.

NUMERALS:

10 pressure sensor
12 housing
14 distal end, housing
16 proximal end, housing
18 seal
20 chamber
20a first end, chamber
20b second end, chamber
22 passageway
22a chamber end of passageway
22b fluid flow end of passageway
22c length, passageway
24 opening, passageway
26 circuit board
28 pressure sensor
30 first temperature sensor
32 second seal
34 backing plate
36 fasteners
38 electronic wiring, circuit board
40 viscous gel
42 empty space, chamber
44 at least one inner sidewall, chamber
46 second temperature sensor

What is claimed is:

1. An electronic pressure sensor, comprising:
a housing comprising a distal end configured to be exposed to a flow of a fluid media to be measured, the distal end opposite a proximal end, wherein the proximal end is configured not to be exposed to the fluid media;
a chamber disposed within the housing, a chamber volume defined by a chamber cross sectional area extending along a chamber length;
a passageway disposed within the housing, a passageway volume defined by a passageway cross sectional area extending along a passageway length, the passageway length connected at one end to the chamber and connected at another end to an opening disposed at the distal end of the housing, wherein the opening is configured to be in fluidic communication with the fluid media;
wherein the chamber cross sectional area is larger than the passageway cross sectional area;
a pressure sensor disposed within the chamber;
a first temperature sensor disposed within the chamber; and
a viscous gel disposed within the chamber, the viscous gel separating on a first side both the pressure sensor and the first temperature sensor apart from the passageway on a second side of the viscous gel.

2. The electronic pressure sensor of claim 1, wherein the chamber defines at least one inner sidewall, wherein the viscous gel fully and continuously in is contact with the at least one inner sidewall.

3. The electronic pressure sensor of claim 2, wherein the pressure sensor and the first temperature sensor are both mounted onto a circuit board next to each other in close proximity, wherein the circuit board is attached to the housing.

4. The electronic pressure sensor of claim 3, wherein the circuit board seals a first end of the chamber and a second end of the chamber is in fluidic communication with the passageway, wherein the first end and second end of the chamber are delimited by the at least one inner sidewall.

5. The electronic pressure sensor of claim 2, wherein a cross section taken perpendicularly through the at least one inner sidewall defines the chamber cross sectional area, wherein the chamber cross sectional area is larger than a pressure sensing area of the pressure sensor exposed to the viscous gel.

6. The electronic pressure sensor of claim 2, wherein a cross section taken perpendicularly through the at least one inner sidewall defines the chamber cross sectional area, wherein the chamber cross sectional area is at least three times larger than a pressure sensing area of the pressure sensor exposed to the viscous gel.

7. The electronic pressure sensor of claim 1, wherein the viscous gel fully encloses and is in contact with the pressure sensor and the first temperature sensor.

8. The electronic pressure sensor of claim 1, wherein the viscous gel is configured to prevent the fluid media from contacting the pressure sensor or first temperature sensor.

9. The electronic pressure sensor of claim 1, wherein the viscous gel is not disposed within the passageway.

10. The electronic pressure sensor of claim 1, wherein the viscous gel does not fully fill the chamber forming an empty space of the chamber to reside connected to the passageway, wherein the empty space is configured as stagnation zone of the fluid media.

11. The electronic pressure sensor of claim 1, wherein the housing is an injection molded polymer housing.

12. The electronic pressure sensor of claim 11, wherein the injection molded polymer housing is clear.

13. The electronic pressure sensor of claim 1, wherein the viscous gel is colored.

14. The electronic pressure sensor of claim 1, including a second temperature sensor disposed within the housing and at least partially exposed at the distal end of the housing to the fluid media, wherein the second temperature sensor is not in fluidic communication with the passageway or the chamber.

15. The electronic pressure sensor of claim 1, wherein the pressure sensor is an electronic bridge pressure sensor.

16. The electronic pressure sensor of claim 1, including a seal formed around the housing, the seal separating the distal end of the housing from the proximal end of the housing, wherein the seal is configured to seal to a fluid pipe containing the fluid media when the electronic pressure sensor is connected to the fluid pipe.

17. The electronic pressure sensor of claim 1, wherein the passageway length extending at the one end of the chamber to the opening disposed at the distal end of the housing is at least five times a diameter of the passageway.

18. The electronic pressure sensor of claim 1, wherein the viscous gel has a viscosity of 465 cP plus or minus 10 percent.

19. The electronic pressure sensor of claim 1, wherein the viscous gel has a viscosity of 465 cP plus or minus 50 percent.

20. An electronic pressure sensor, comprising:
a housing comprising a distal end configured to be exposed to a flow of a fluid media to be measured, the distal end opposite a proximal end, wherein the proximal end is configured not to be exposed to the fluid media;
a chamber disposed within the housing;
a passageway disposed within the housing, the passageway connected at one end to the chamber and connected at another end to an opening disposed at the distal end of the housing, wherein the opening is configured to be in fluidic communication with the fluid media;
a pressure sensor disposed within the chamber;
a first temperature sensor disposed within the chamber;
a viscous gel disposed within the chamber, the viscous gel separating on a first side both the pressure sensor and the first temperature sensor apart from the passageway on a second side of the viscous gel;
wherein the chamber defines at least one inner sidewall, wherein the viscous gel fully and continuously in is contact with the at least one inner sidewall;
wherein the viscous gel fully encloses and is in contact with the pressure sensor and the first temperature sensor;
wherein the viscous gel is not disposed within the passageway;
wherein the pressure sensor and the first temperature sensor are both mounted onto a circuit board, wherein the circuit board is attached to the housing;
wherein a cross section taken perpendicularly through the at least one inner sidewall defines a chamber cross sectional area, wherein the chamber cross sectional area is at least three times larger than a pressure sensing area of the pressure sensor exposed to the viscous gel;
wherein the passageway disposed within the housing defines a passageway length, the passageway length extending at the one end of the chamber to the opening disposed at the distal end of the housing, wherein the length is at least five times the width of the passageway; and
a second temperature sensor disposed within the housing and at least partially exposed at the distal end of the housing to the fluid media, wherein the second temperature sensor is not in fluidic communication with the passageway or the chamber but is in fluidic communication with the fluid media.

21. An electronic pressure sensor, comprising:
a housing comprising a distal end configured to be exposed to a flow of a fluid media to be measured, the distal end opposite a proximal end, wherein the proximal end is configured not to be exposed to the fluid media;
a chamber disposed within the housing;
a passageway disposed within the housing, the passageway connected at one end to the chamber and connected at another end to an opening disposed at the distal end of the housing, wherein the opening is configured to be in fluidic communication with the fluid media;
a pressure sensor disposed within the chamber;
a first temperature sensor disposed within the chamber;
a single viscous gel disposed within the chamber and not disposed within the passageway, the viscous gel separating on a first side both the pressure sensor and the first temperature sensor apart from the passageway on a second side of the viscous gel;
wherein a cross section taken perpendicularly through the at least one inner sidewall defines a chamber cross sectional area, wherein the chamber cross sectional area is at least three times larger than a pressure sensing area of the pressure sensor exposed to the viscous gel; and
wherein the passageway disposed within the housing defines a passageway length, the passageway length extending at the one end of the chamber to the opening disposed at the distal end of the housing, wherein the length is at least eight times the width of the passageway.

22. An electronic pressure sensor, comprising:
a housing comprising a distal end configured to be exposed to a flow of a fluid media to be measured, the distal end opposite a proximal end, wherein the proximal end is configured not to be exposed to the fluid media;
a chamber disposed within the housing;
a passageway disposed within the housing, the passageway connected at one end to the chamber and connected at another end to an opening disposed at the distal end of the housing, wherein the opening is configured to be in fluidic communication with the fluid media;
a pressure sensor disposed within the chamber;
a first temperature sensor disposed within the chamber;
a viscous gel disposed within the chamber, the viscous gel separating on a first side both the pressure sensor and the first temperature sensor apart from the passageway on a second side of the viscous gel; and
a second temperature sensor disposed within the housing and at least partially exposed at the distal end of the housing to the fluid media, wherein the second temperature sensor is not in fluidic communication with the passageway or the chamber.

23. An electronic pressure sensor, comprising:
a housing comprising a distal end configured to be exposed to a flow of a fluid media to be measured, the distal end opposite a proximal end, wherein the proximal end is configured not to be exposed to the fluid media;
a chamber disposed within the housing;
a passageway disposed within the housing, the passageway connected at one end to the chamber and connected at another end to an opening disposed at the distal end of the housing, wherein the opening is configured to be in fluidic communication with the fluid media;
a pressure sensor disposed within the chamber;
a first temperature sensor disposed within the chamber;
a single viscous gel disposed within the chamber and not disposed within the passageway, the viscous gel separating on a first side both the pressure sensor and the first temperature sensor apart from the passageway on a second side of the viscous gel.

* * * * *